(12) United States Patent
Takahashi et al.

(10) Patent No.: US 7,395,451 B2
(45) Date of Patent: Jul. 1, 2008

(54) APPARATUS, METHOD AND PROGRAM FOR THE CONTROL OF STORAGE

(75) Inventors: Hideo Takahashi, Kawasaki (JP); Tsukasa Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 530 days.

(21) Appl. No.: 11/008,143

(22) Filed: Dec. 10, 2004

(65) Prior Publication Data

US 2006/0069947 A1    Mar. 30, 2006

(30) Foreign Application Priority Data

Sep. 10, 2004    (JP)    ............................. 2004-263833

(51) Int. Cl.
*G06F 11/00*    (2006.01)
(52) U.S. Cl. .......................... 714/5; 711/114
(58) Field of Classification Search ................. 714/5–8, 714/13, 15, 42
See application file for complete search history.

(56) References Cited

U.S. PATENT DOCUMENTS

| | | | |
|---|---|---|---|
| 5,892,780 A * | 4/1999 | Munetoh et al. ............. | 714/801 |
| 6,195,760 B1 * | 2/2001 | Chung et al. ................ | 714/4 |
| 6,553,511 B1 * | 4/2003 | DeKoning et al. ........... | 714/6 |
| 7,043,663 B1 * | 5/2006 | Pittelkow et al. ............ | 714/4 |
| 7,058,762 B2 * | 6/2006 | Patterson et al. ............ | 711/114 |
| 2003/0105767 A1 * | 6/2003 | Sonoda et al. ............... | 707/100 |
| 2004/0250161 A1 * | 12/2004 | Patterson ..................... | 714/6 |
| 2004/0260967 A1 * | 12/2004 | Guha et al. .................. | 714/3 |

FOREIGN PATENT DOCUMENTS

| | | |
|---|---|---|
| CN | 1035573 | 9/1989 |
| CN | 1512510 | 7/2004 |
| JP | 4-67476 | 3/1992 |
| JP | 6-243132 | 9/1994 |
| JP | 7-84858 | 3/1995 |
| JP | 9-62658 | 3/1997 |
| JP | 9-167120 | 6/1997 |
| JP | 10/247134 | 9/1998 |
| JP | 10-275060 | 10/1998 |
| JP | 10-283122 | 10/1998 |
| JP | 2000-89989 | 3/2000 |
| JP | 2000-339206 | 12/2000 |
| JP | 2003-233468 | 8/2003 |
| JP | 2004-22136 | 1/2004 |
| JP | 2004-227560 | 8/2004 |

* cited by examiner

*Primary Examiner*—Nadeem Iqbal
(74) *Attorney, Agent, or Firm*—Staas & Halsey LLP (57) ABSTRACT

A storage control apparatus is provided that comprises a failure monitoring unit arranged to add points in proportion to detected abnormality to find statistically added points for each of N disk devices, the failure monitoring unit issuing an instruction to re-create parity when the statistically added points come closer to a predefined failure determination point, the failure monitoring unit issuing an instruction to disconnect the failed disk device when the statistically added points exceed the failure determination point; and a parity re-creation unit arranged, when receiving the instruction to re-create parity from the failure monitoring unit, to read the plural pieces of user data from (N-1) disk devices to re-calculate parity data for write into the remaining one (1) disk device for each of all addresses of the plurality of disk devices.

17 Claims, 7 Drawing Sheets

APPARATUS, METHOD AND PROGRAM FOR THE CONTROL OF STORAGE

This application is a priority based on prior application No. JP 2004-263833, filed Sep. 10, 2004, in Japan.

CROSS-REFERENCE TO RELATED APPLICATION

This application claims the benefit of priority to prior application No. JP 2004-263833, filed Sep. 10, 2004 in Japan.

BACKGROUND OF THE INVENTION

1. Field of the Invention

The present invention relates generally to a storage control apparatus, method and program for a disk array, etc., securing data redundancy through RAID configuration and, more particularly, to a storage control apparatus and control method and program assuring data recovery based on the redundancy configuration upon failure disconnection of a storage device.

2. Description of the Related Art

In a conventional disk array system, data redundancy has been enhanced by configuring RAID (Redundant Array of Independent Disks) composed of a plurality of disk devices arranged in a disk array, to respond to I/O requests from a host. Though various types of RAIDs exist, RAID5 has ordinarily been used that is suited for I/O requests from the host attendant on the transaction processing. The RAID5 writes user data into (N-1) disk devices having the same logical block address making up a stripe, of N disk devices configuring a disk array, and writes a parity into the remaining one, the parity being generated by EXORing the user data, the disk device with the parity written thereinto being different from stripe to stripe so that the parities can be distributed. In the disk array system having such a RAID5 redundant configuration, when a disk device fails and degenerates, the user data of the failed disk device can be recovered by implementing the EXOR operation of the user data and the parity read from the other disk devices forming a RAID group together with the failed disk device.

Such a conventional RAID5 disk array system, however, may face the worst situation possible that the data cannot be recovered and goes lost due to being incapable of the EXOR operation in case, when a disk device fails and degenerates, data cannot be read from two or more disk devices including the failed one. The following may be considered as causes of rendering the data recovery infeasible upon the occurrence of a failure in the disk device. First, is a case where the parity consistency has broken down as a result of the parity going abnormal due to some reasons such as design errors of firmware of the disk device. There is another case where an abnormality has occurred in a medium of the other disk device than the failed disk device. Furthermore, a portion unsubjected to read and write for a long while may appear even at the same logical block address on the same stripe, and such a portion may not probably undergo data recovery due to the medium abnormality occurring thereat.

SUMMARY OF THE INVENTION

It is the object of the present invention to provide a storage control apparatus and control method and program preventing data from becoming unreadable from two or more storage devices contained in the RAID group and preventing the read parity from becoming inconsistent when the storage device has failed, as well as securely obviating the occurrence of the situation where data of the failed storage device goes lost without being recovered.

The present invention is characterized by a storage control apparatus configured to write plural pieces of user data into (n-1) storage devices of n storage devices and to write parity data calculated from the plural pieces of user data into remaining one (1) storage device, the storage control apparatus comprising a failure monitoring unit arranged to add points in proportion to detected abnormality to find statistically added points for each of the storage devices, the failure monitoring unit issuing an instruction to re-create parity when the statistically added points come closer to a predefined failure determination point; and a parity re-creation unit arranged, when receiving the instruction to re-create parity from the failure monitoring unit, to read the plural pieces of user data from the (n-1) storage devices to re-calculate parity data for write into the remaining one (1) storage device. The failure monitoring unit issues an instruction to initiate re-creation of parity when the statistically added points reach a given threshold value obtained by multiplying the failure determination point by a coefficient less than 1. The failure monitoring unit issues an instruction to initiate re-creation of parity when the statistically added points reach a given threshold value obtained by multiplying the failure determination point by a coefficient in the range of 0.7 to 0.9. The failure monitoring unit initiates re-creation of parity when self-diagnostic abnormality based on SMART (Self-Monitoring, Analysis and Reporting Technology) feature is output from one of the plurality of storage devices. The SMART acts to previously collect error rates in read-out and write-in operations of the hard disk, determine the time at which itself becomes inoperable based on the error ratios and notify the user thereof to urge the user to perform data backup prior to the termination of operation. The SMART is incorporated in ATA/ATAPI standard. The storage control apparatus of the present invention further comprises a channel adapter connecting to a host, a device adapter connecting the plurality of storage devices to one another, and a central processing module interposed between the channel adapter and the device adapter, the failure monitoring unit being disposed in the central processing module, with the parity re-creation unit disposed in the device adapter, the central processing module instructing the device adapter on re-creation of parity for execution.

The present invention provides a storage control method. In the storage control method of the present invention writing plural pieces of user data into (n-1) storage devices of n storage devices and writing parity data calculated from the plural pieces of user data into remaining one (1) storage device, it comprises a failure monitoring step of issuing an instruction to re-create parity depending on the degree of detected abnormality for each of the storage devices; and a parity re-creation step, when receiving the instruction to re-create parity from the failure monitoring step, of reading the plural pieces of user data from the (n-1) storage devices to re-calculate parity data for write into the remaining one (1) storage device. The present invention provides a storage control program. The program of the present invention is operable to drive a computer of a storage control apparatus writing plural pieces of user data into (n-1) storage devices of n storage devices and writing parity data calculated from the plural pieces of user data into remaining one (1) storage device to execute a failure monitoring step of adding points in proportion to detected abnormality to find statistically added points for each of the storage devices, and issuing an instruction to re-create parity when the statistically added points come closer to a predefined failure determination point; and a parity re-creation step, when receiving the instruction to re-create parity from the failure monitoring step, of reading the plural pieces of user data from the (n-1) storage devices to re-calculate parity data for write into the remaining one (1) storage device. Details of the storage control method and program in accordance with the present invention are basically the same as those of the storage control apparatus.

According to the present invention, immediately before a storage device contained in the RAID group goes down, the user data are read out and parity is re-created for being written into a storage device for parity, whereby the consistency and reliability of the parity can be secured when a specific storage device has failed, to thereby obviate the worst possible situation where data goes lost without correct data being recovered due to inconsistent parity upon the occurrence of failure of the storage device. Since user data are read out from all the storage devices upon re-creation of the parity with the re-created parity being written into the storage device for parity, medium abnormality of all the storage devices can be detected so that execution of replacement processing for the medium abnormality enables the worst possible situation to securely be prevented where data cannot be read due to the medium abnormality from two or more storage devices including the failed storage device and goes lost when the failure of the storage device has occurred. The above and other objects, features, and advantages of the present invention will become more apparent from the following detailed description with reference to the drawings.

DETAILED DESCRIPTION OF THE PREFERRED EMBODIMENT

Figure 1:
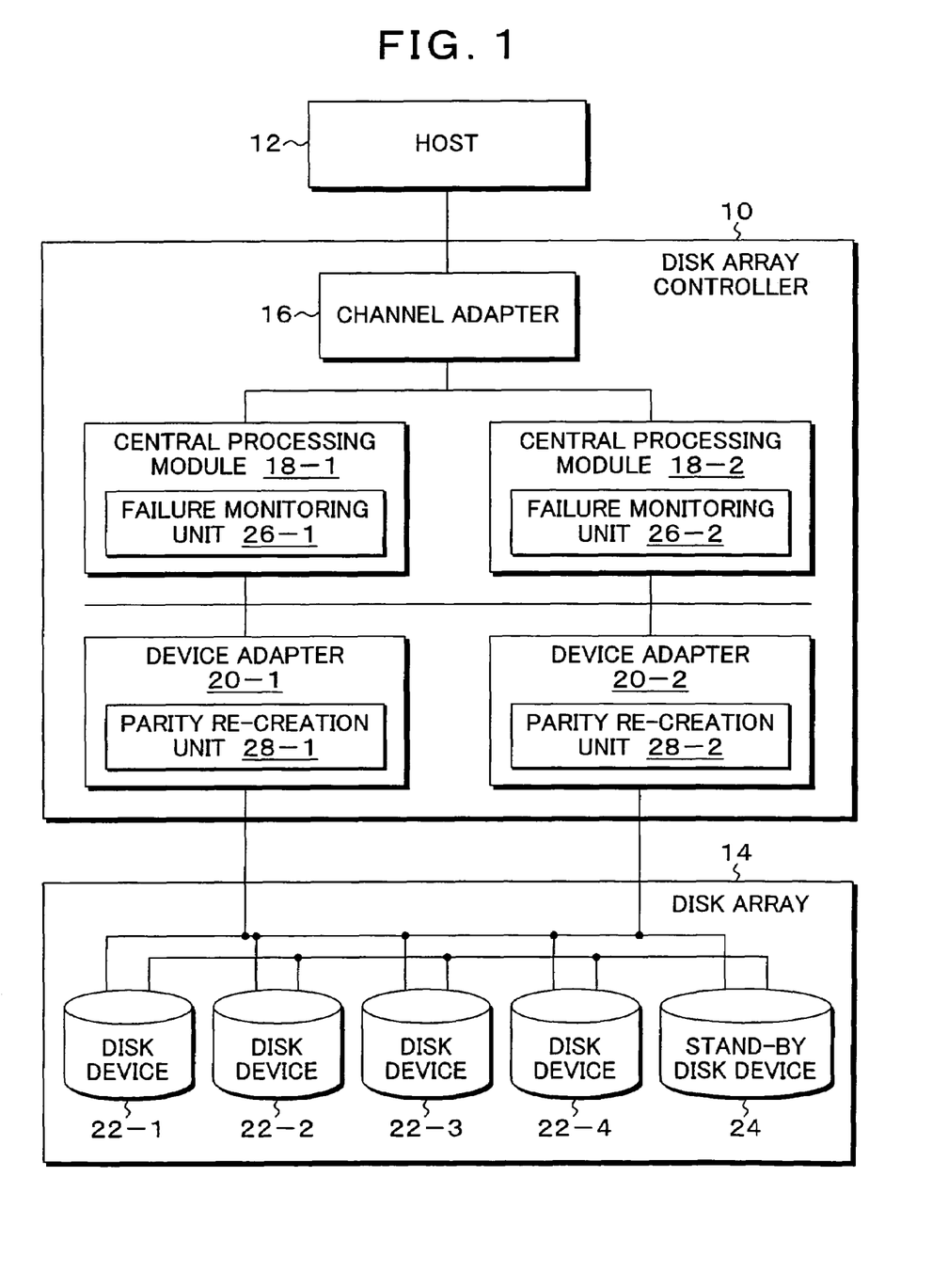
FIG. 1 is a block diagram of the function configuration of a disk array system employing the present invention.

FIG. 1 is a block diagram of the function configuration of a disk array system to which the present invention is applied. In FIG. 1, the disk array system is constituted of a disk array control apparatus 10 acting as a storage controller, and a disk array 14. The disk array control apparatus 10 is provided with a channel adapter 16, central processing modules (PM) 18-1 and 18-2, and device adapters 20-1 and 20-2. The channel adapter 16 is coupled to a host 12 to process interface control for I/O requests from the host 12. When the channel adapter 16 receives a data write operation request or a data read operation request from the host 12, the channel adapter 16 notifies either the central processing module 18-1 or 18-2 of the operation request, and makes direct access to a cache memory disposed in the central processing modules 18-1 and 18-2 to effect data transfer between the channel adapter 16 and the host 12. The central processing modules 18-1 and 18-2 are core modules of the disk array control apparatus 10 and each execute three processings, i.e., resource manage-ment, cache memory management and service. The resource management includes management of function module resources and effective control management. The cache memory management includes management of assignment to memory areas disposed in the central processing modules 18-1 and 18-2 and entire cache control. The service provides various services by maintenance tools. The device adapters 20-1 and 20-2 are connected via a fiber channel interface to the disk devices 22-1 to 22-4 acting as storage devices and a stand-by disk device 24 that are disposed in the disk array 14, to provide control of the fiber channel interface, I/O control of the disk devices, RAID control, etc., in this embodiment, RAID control of RAID5. The four disk devices 22-1 to 22-4 disposed in the disk array 14 are arranged to accommodate control having RAID5 redundant configuration provided by the device adapters 20-1 and 20-2, with the additional stand-by disk device 24 acting as a hot standby which replaces any failed disk device. In such a disk array system of the present invention, the central processing modules 18-1 and 18-2 of the disk array control apparatus 10 are provided with failure monitoring units 26-1 and 26-2, whilst the device adapters 20-1 and 20-2 are provided with parity re-creation units 28-1 and 28-2. The failure monitoring units 26-1 and 26-2 disposed in the central processing modules 18-1 and 18-2 accumulate points in proportion to abnormality detected, to obtain statistically added points for each of the four disk devices 22-1 to 22-4 having the RAID5 redundant configuration disposed in the disk array 14. When the statistically added points come closer to a predefined failure determination point, the failure monitoring units 26-1 and 26-2 issue an instruction on re-creation of parity. When the statistically added points exceed the failure determination point, the failure monitoring units 26-1 and 26-2 make a failure determination to issue an instruction on disconnection of the failed disk device. When receiving the instruction on parity re-creation from the failure monitoring unit 26-1 or 26-2, the parity re-creation units 28-1 and 28-2 disposed in the device adapters 20-1 and 20-2 execute parity re-creation processing for the four disk devices 22-1 to 22-4 where user data are read out from three disk devices for each of logical block addresses in volumes, i.e., logical areas configured on disks of the disk devices 22-1 to 22-4 to re-calculate the parity data through exclusive OR processing for write into the remaining one disk device. It is to be noted that the disk array control apparatus 10 of the disk array system of FIG. 1 is shown having its minimal system configuration and may further be provided with, as necessary, additional channel adapters, central processing modules, device adapters and disk devices of the disk array 14. The central processing modules 18-1 and 18-2 and the device adapters 20-1 and 20-2 have respective dual configurations such that for I/O requests from the host 12, the central processing module 18-1 and the device adapter 20-1 may act as primary side, for example, with the central processing module 18-2 and the device adapter 20-2 as the secondary side and such that for I/O requests from the host 12, the primary side may be enabled with the secondary side providing backup upon the occurrence of a failure.

Figure 2A:
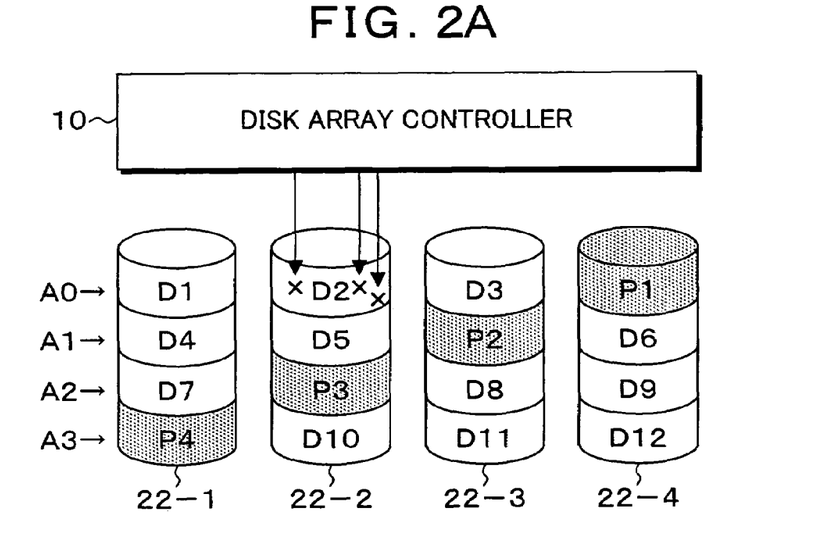
FIGS. 2A and 2B are explanatory views of statistically added points and parity re-creation based on the detection of a failure in the present invention.
Figure 2B:
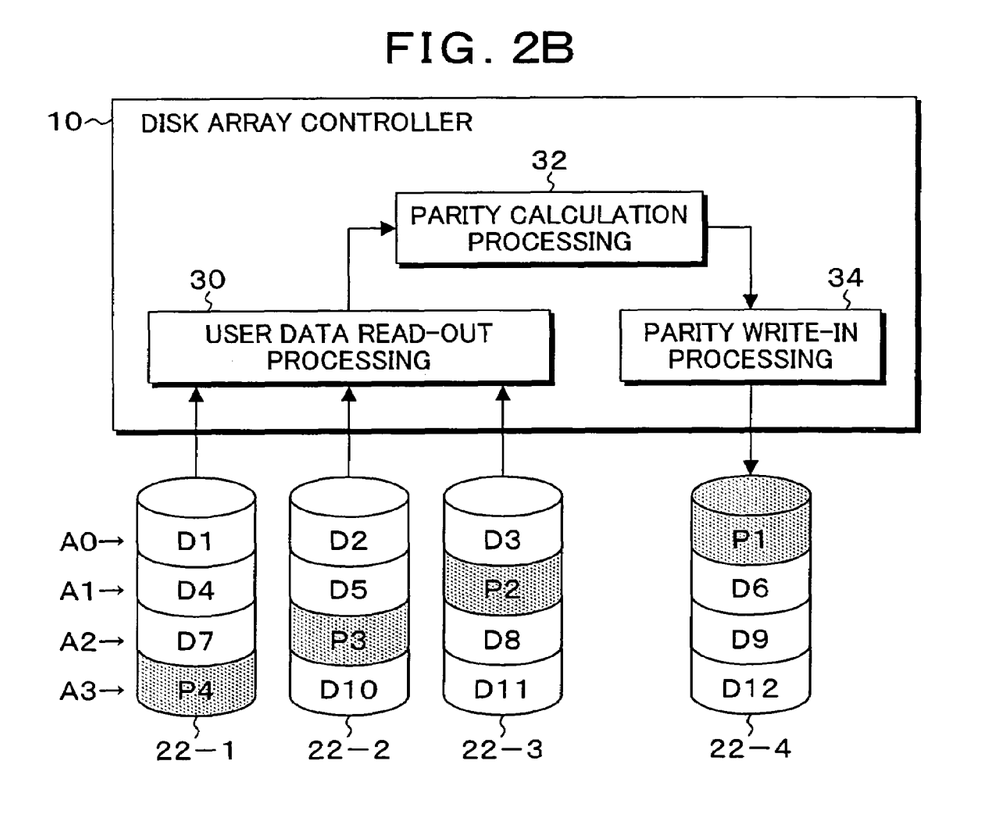

FIGS. 2A and 2B are explanatory views of the statistically added points and the parity re-creation based on the detection of a failure of the disk devices in the disk array system of the present invention. FIG. 2A shows the disk array control apparatus 10 and the four disk devices 22-1 to 22-4 disposed in the disk array 14 associated therewith. Due to its RAID5 redundant configuration, the disk devices 22-1 to 22-4 each have stripes separated by the logical block addresses A0, A1, A2, A3, . . . in the volumes, i.e., logical areas configured on the disk devices such that the four disk devices 22-1 to 22-4 are subjected to concurrent execution of data I/O for the stripes at the same logical block address. In the description which follows, the stripes are designated at A0, A1, A2 and A3. In the RAID5 redundant configuration, user data is stored in three of the four disk devices 22-1 to 22-4 and parity data is stored in the remaining one disk device. When the stripes at the logical block address are viewed for example, user data D1, D2 and d3 are stored in the three disk devices 22-1 to 22-3, with the remaining one disk device 22-4 storing parity P1 calculated from the EXOR operation of the D1, D2 and D3. In this manner, although it is common to all the stripes that the stripes at the same logical block address of the four disk devices 22-1 to 22-4 store three pieces of user data and one piece of parity data, different disk devices store different parity data on a stripe by stripe basis so that the parity data is distributed. That is, on the stripe A1 the disk device 22-3 stores parity data P2, on the stripe A2 the disk device 22-2 stores parity data P3, and on the stripe A3 the disk device 22-1 stores parity data P4. In the disk array system having such a RAID5 redundant configuration, when user data D2 on the stripe A0 is desired to be read out in case the disk device 22-2 has failed for example, user data D1, D3 and parity data P1 are read out from the normal disk devices 22-1, 22-3 and 22-4 so that the three pieces of data are EXORed to recover the user data D2 of the failed disk device 22-2 for response to the host. Write of the user data D2 from the host to the failed disk device 22-2 is as follows. Let the user data D1, D2, D3 and parity data P1 prior to the write be old data $D1_{old}$, $D2_{old}$, $D3_{old}$, and old parity $P1_{old}$, respectively. Let the write data from the host be new data $D2_{new}$. First, the old data $D1_{old}$, $D3_{old}$ and old parity $P1_{old}$ are read out from the disk devices 22-1, 22-3 and 22-4, respectively to obtain the old data $D2_{old}$ of the failed disk device 22-2 as $$D2_{old}=D1_{old}(+)D3_{old}(+)P1_{old}$$

where (+) represents exclusive OR.

The new parity $P1_{new}$ is then obtained from the old data $D2_{old}$, new data $D2_{new}$ and old parity $P1_{old}$ as new parity=old parity (+) old data+new data $$P1_{new}=P1_{old}(+)D2_{old}(+)D2_{new}$$

The thus obtained new parity $P1_{new}$ is written into the disk device 22-4 so that thereafter a read response become possible with the user data D2 recovered by EXORing the user data D1, D3 and parity P1 read in response to a read request of the user data D2 to the failed disk device 22-2. When receiving notification of error from the failure monitoring unit 26-1 via the device adapter 20-1 for example shown in FIG. 1, the disk array control apparatus 10 accumulates points in proportion to the content of the notified error to obtain the statistically added points for each of the disk devices 22-1 to 22-4 having such a RAID5 redundant configuration. Once the statistically added points exceed a failure determination point, e.g., 255 points for judging the occurrence of pre-defined failures of a disk device, the disk device is regarded as having failed and is disconnected from the disk array system for being disabled, thus allowing the RAID5 redundant configuration to effect the processings for the read request and write request. The content of errors contained in the statistically added points can be, e.g., abnormality of medium upon read, abnormality of actuator control, abnormality of read-related command, abnormality of power saving capability, lowering of read properties. Points in proportion to the degree of errors are predefined for accumulation. In addition to the processing of statistically added points responsive to the error notification for the disk devices 22-1 to 22-4, it is determined in the present invention that the statistically added points have come closer to a failure determination point, 255 points, at which the disk device is regarded as having failed, to instruct the device adapter 20-1 on the parity re-creation processing. Aside from the failure determination point of 255 points, 200 points for example are available as a threshold value to issue an instruction on parity re-creation as a result of determination of being immediately before the failure. Also available as another threshold value are points obtained by multiplying 255 points of the failure determination point with, e.g., a coefficient of 1 or less such as 0.7 to 0.9.

FIG. 2A shows the status where e.g., three-times of medium errors have occurred in the read operation of user data D2 of the disk device 22-2 on the stripe A0 specified by the disk array control apparatus 10. The instruction on parity re-creation is issued when the statistically added points of the disk device 22-2 exceed 200 points as a result of occurrence of the medium errors. FIG. 2B shows the processing operations for parity re-creation in case that the statistically added points of the disk device 22-2 exceed the threshold value. The parity re-creation processing is effected for the four disk devices 22-1 to 22-4 making up the group of RAID5 in the disk array 14, while specifying the strips A0, A1, A2, A3, etc., in sequence. As to the stripe A0 for example, user data D1, D2 and D3 are read out through user data read-out processing 30 from the disk devices 22-1 to 22-3 storing the user data D1, D2 and D3 of the four disk devices 22-1 to 22-4. The three pieces of user data D1, D2 and D3 are then subjected to parity calculation processing 32 to effect EXOR operation $$P1=D1(+)D2(+)D3$$

to calculate the parity. The calculated parity is then written into the disk device 22-4 on the stripe A0 through parity write-in processing 34, to thereby issue an instruction on the parity re-creation of the stripe A0. Similar parity re-creation processing is repeated for each of the logical block addresses indicated by the stripes A1, A2, A3, etc. By virtue of such parity re-creation processing effected immediately before the occurrence of a failure of the disk device where user data are read out from three disk devices of all the disk devices 22-1 to 22-4 in the disk array 14 with parity data being written into the remaining one, read-out operation of the user data and the write-in operation of the parity data are effected without exception for all the stripes (all the logical block addresses) of all of the disk devices.

As a result, check is made of all the stripes (all the logical block addresses) of the disk devices 22-1 to 22-4. Thus, in case that a medium failure occurs, a replacement area is secured by the replacement processing into which data or parity recovered by RAID5 is written, whereby check of the medium failure can be done over all the areas of all the disk devices 22-1 to 22-4 prior to the occurrence of a failure of the disk device 22-2. For all the stripes (all the logical block addresses) of all the disk devices 22-1 to 22-4, the distributedly stored parity data are calculated and written in upon read-out of the user data on the same stripe, thus assuring the consistency and effectiveness of the parity data. In consequence, if the statistically added points exceed 255 points as the failure determination point as a result of error notifications after the parity re-creation, with the result that the disk device 22-2 is disconnected as a failed disk device, then the recovery and the assurance of parity consistency based on the replacement processing against the medium abnormality is completed due to the parity re-creation operation effected immediately before the occurrence of the failure. Thus, from the remaining three normal disk devices 22-1, 22-3, and 22-4, there can normally be conducted the recovery of the read data in conformity with the redundant configuration of RAID5 and the rewrite of the parity data corresponding to the write-in of the write data, thereby securely obviating the occurrence of the worst possible situation where RAID5-based data recovery becomes impossible leading to lost data as a result of failing to read out the data from two or more disk devices including the failed disk device or of lacking the parity data consistency.

Figure 3:
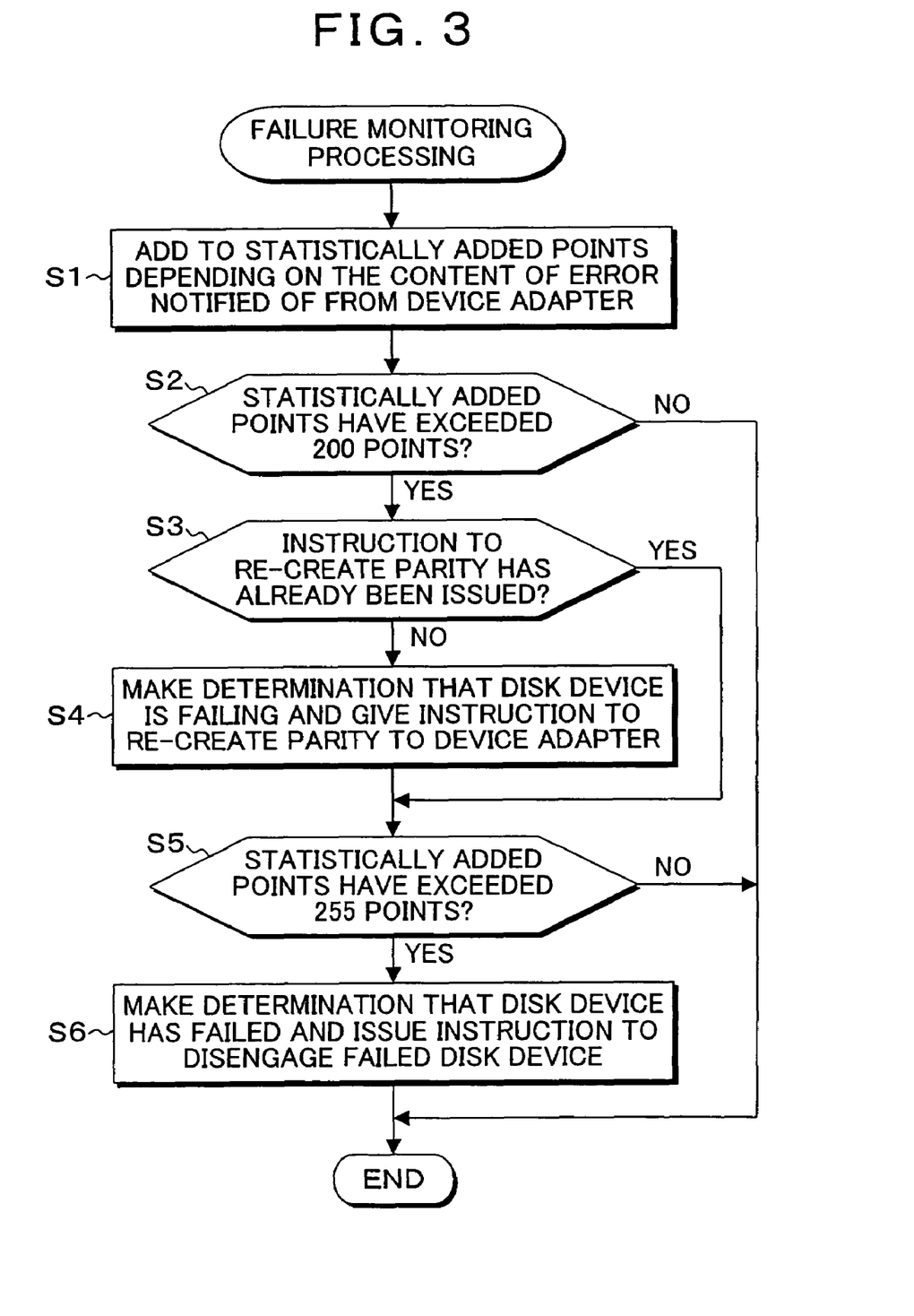
FIG. 3 is a flowchart of failure monitoring processing effected by a central processing module of FIG. 1.

FIG. 3 is a flowchart of failure monitoring processing effected by the failure monitoring units 26-1 and 26-2 disposed in the central processing modules 18-1 and 18-2 of FIG. 1. In FIG. 3, at step S1 points are-added to the statistically added points depending on the content of error notified from the device adapter, and thereafter at step S2 it is checked whether the statistically added points have exceeded 200 points as a threshold value to determine the parity re-creation. If the statistically added points have exceeded 200 points, then at step S3 it is checked whether an instruction on parity re-creation has been given to the device adapter. If negative, then at step S4 the disk device is determined as being immediately before the occurrence of failure, instructing the device adapter on the parity re-creation. Then, at step S5 it is checked whether the statistically added points have exceeded 255 points as the failure determination point, and since negative in this case, the processing comes to an end. Then, in case that the failure monitoring processing of FIG. 3 has been executed in response to the error notification from the device adapter after the instruction on the parity re-creation has been given to the device adapter at step S4, since the parity has already been re-created at step S3, the procedure goes to step S5 where it is checked whether the statistically added points have exceeded 255 points. If affirmative, then at step S6 the disk device is determined as having failed, issuing an instruction on the disconnection of the failed disk device.

Figure 4:
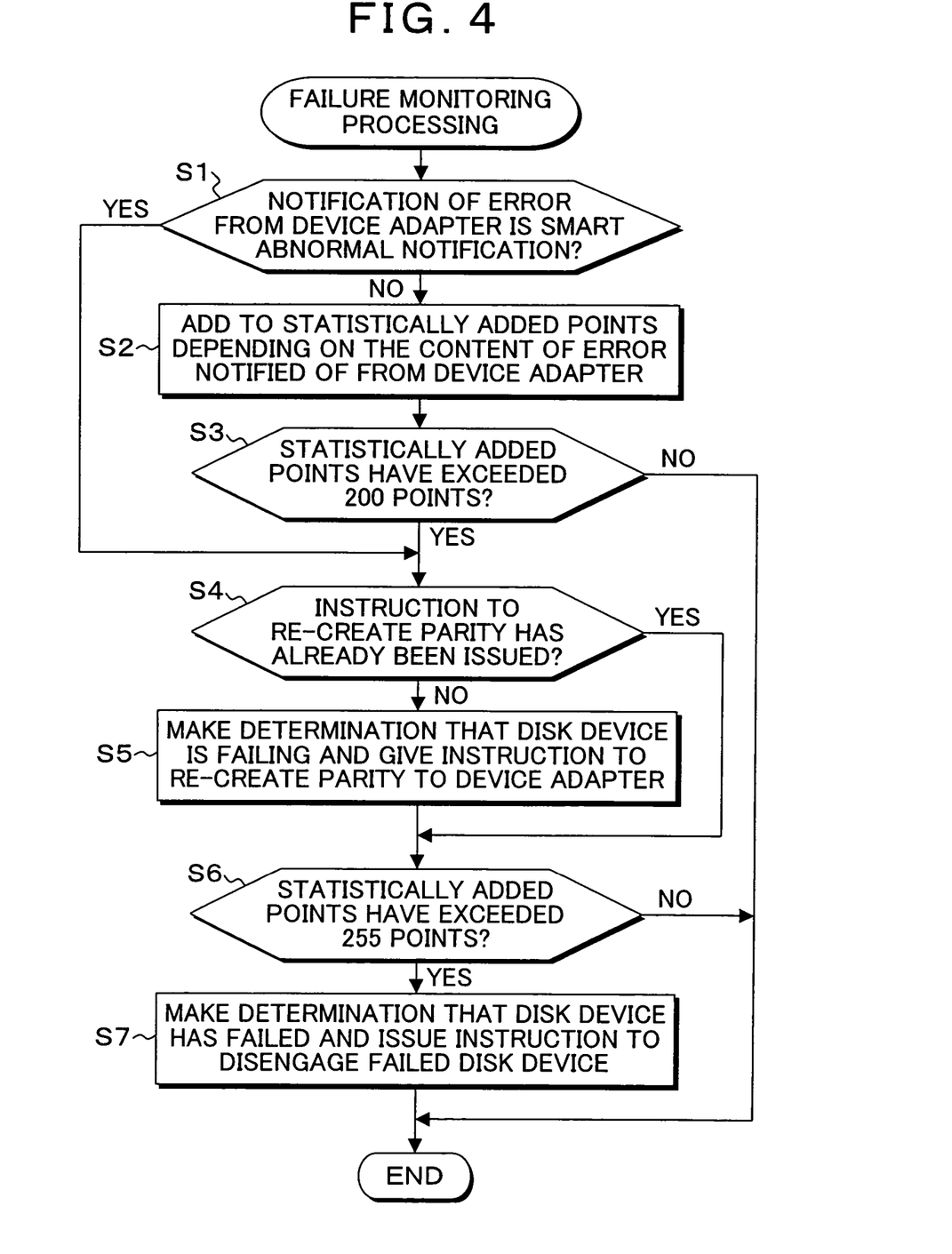
FIG. 4 is a flowchart of other failure monitoring processing effected by the central processing module of FIG. 1.

FIG. 4 is a flowchart of other failure monitoring processing effected by the central processing modules. This embodiment is characterized in that if the error notification from the device adapter is a SMART abnormality notification, the disk device is determined as having failed, with the result that an instruction on the parity re-creation is issued. That is, in the processings of FIG. 4, at step S1 it is checked whether the error notification from the device adapter is a SMART abnormality notification or not. Since the disk devices 22-1 to 22-3 are ordinarily provided with a SMART system, the disk device is determined as being immediately before the occurrence of a failure when it is the SMART abnormality notification, and at step S5 an instruction on the parity re-creation is given to the device adapter. Similar to the failure monitoring processing of FIG. 3, the processings of steps S2 to S7 include adding points to the statistically added points depending on the content of error in response to the error notification from the device adapter, and issuing an instruction on the parity-recreation when the statistically added points exceed 200 points. It is to be noted that although in FIG. 4 the instruction on the parity re-creation is issued in response to earlier one of the point of time where the statistically added points have exceed 200 points and the point of time where the SMART abnormality notification has been received, only the SMART abnormality notification may trigger the instruction on the parity re-creation without using the statistically added points.

Figure 5:
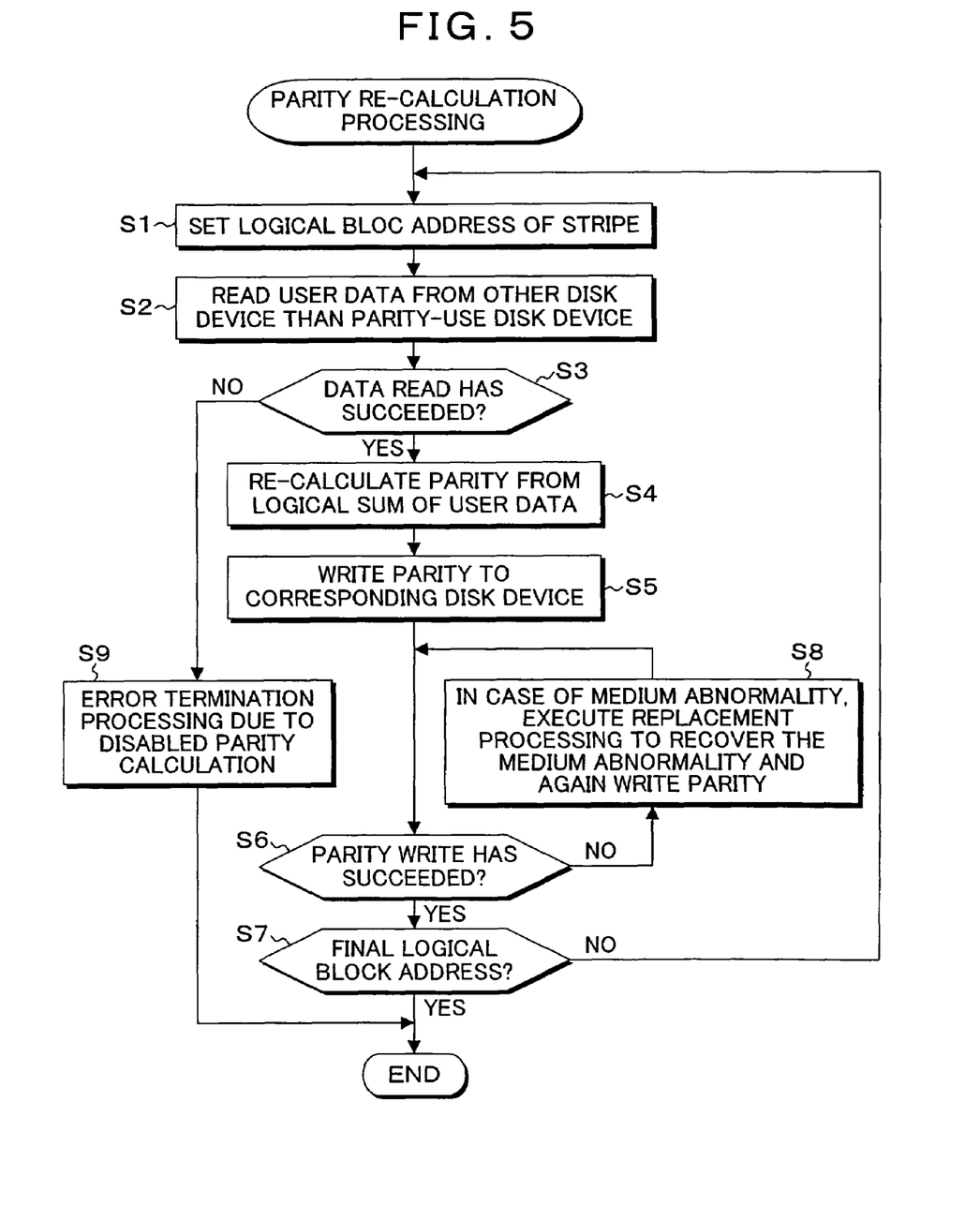
FIG. 5 is a flowchart of parity re-calculation processing effected by a device adapter of FIG. 1.

FIG. 5 is a flowchart of parity re-creation processing effected by the device adapter of FIG. 1. In FIG. 5, the parity re-calculation processing is started up based on a parity re-creation instruction from the central processing modules. First, at step S1, the logical block addresses are set as the stripes and at step S2 user data are read from other disk devices than the disk device for parity. Then at step S3 it is checked whether data read has succeeded or not. In case of having failed in the data read, then at step S9 error termination processing results due to incapability of calculating the parity. In case at step S3 data read has succeeded, then at step S4 the parity is re-calculated through the EXOR operation of the user data. Then at step S5 the re-calculated parity is written into the corresponding disk device. If at step S6 the parity write-in has succeeded, then at step S7 it is checked whether the final logical block address has been reached or not. If the final logical block address has not been reached, then the procedure goes back to step Si to set the next logical block address for repetition of the same processings. If the final logical block address has been reached, a series of processings come to an end. In case of having failed in the parity read-in at step S6, then at step S8 the replacement processing is executed and then parity is again written into the replaced area if the cause for the failure is a medium abnormality.

Figure 6A:
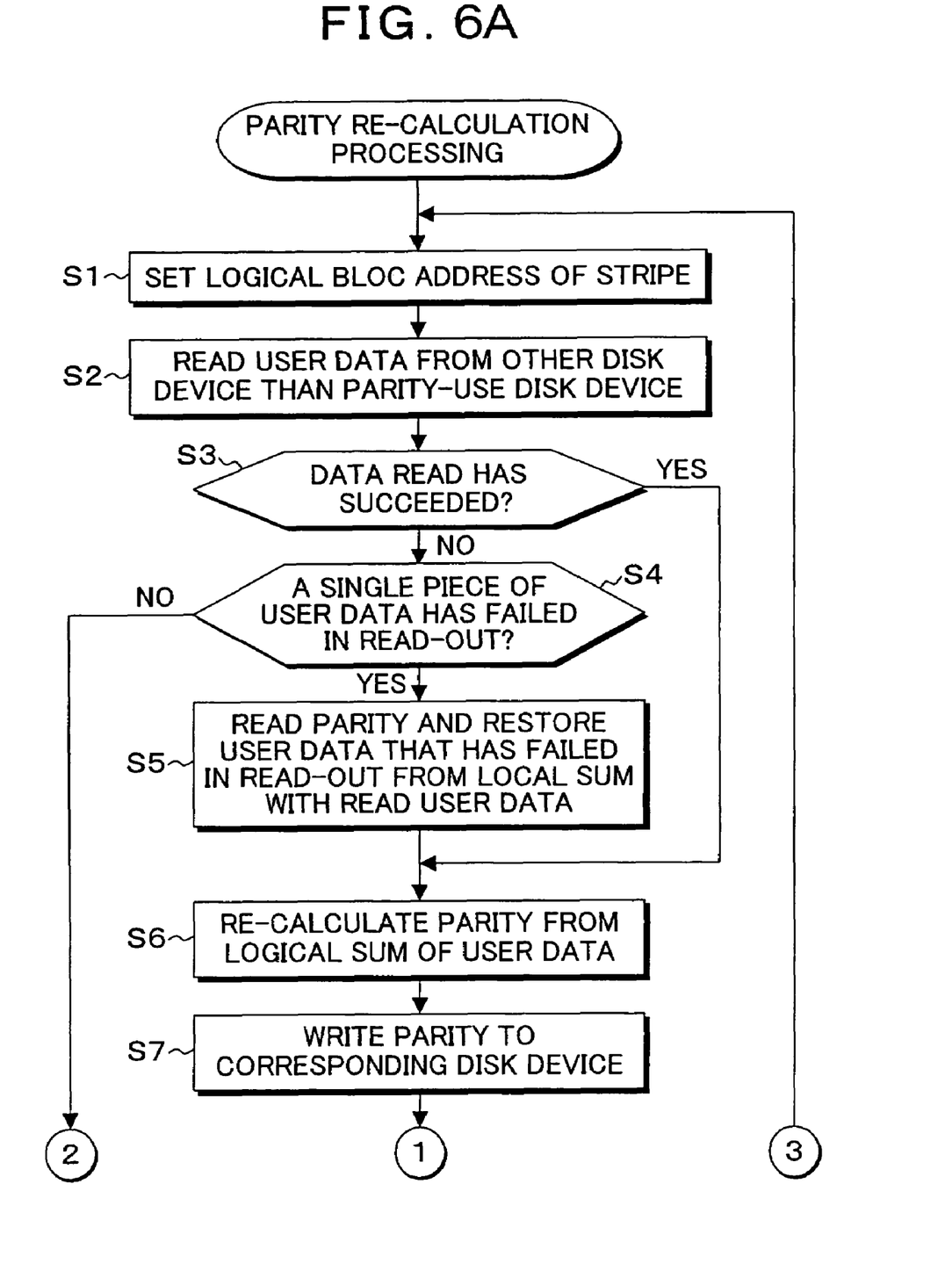
FIGS. 6A and 6B are flowcharts of other parity re-calculation processing effected by the device adapter of FIG. 1.
Figure 6B:
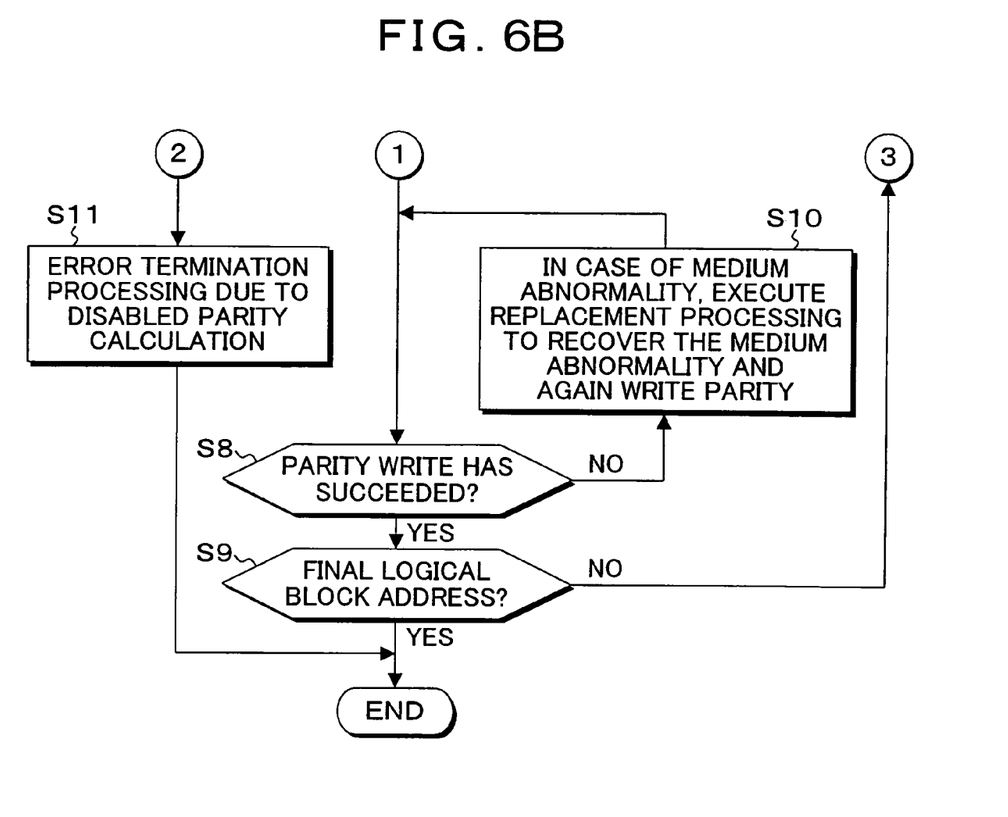

FIGS. 6A and 6B are flowcharts of other parity re-creation processing effected by the device adapter of FIG. 1. This parity re-calculation processing is characterized in that in case of having failed in read-out of a single piece of user when the user data read-out has failed, the data having failed in read-out are recovered and the parity re-creation is made in accordance with the RAID5 redundant configuration. In FIGS. 6A and 6B, at step S1 logical block addresses are set as the stripes, and then at step S2 user data are read from other disk devices than the disk device for parity. Then, at step D3 it is checked whether the data read-out has succeeded or not. In case of having failed in data read-out at that time, it is checked at step S4 whether a single piece of user data has failed in read-out. If a single piece of user data has failed in the read-out, then at step S5 the parity is read out to recover the user data having failed in the read-out from the EXOR operation of that failed user data and the normally read-out remaining two pieces of user data. Then at step S6 the parity is re-calculated by EXORing the user data. In case two or more pieces of user data have failed in read-out at step S4, error ending processing results at step 11 due to the incapability of recovering. After the re-calculation of parity at step S6, the parity is written into the corresponding disk device at step S7, and if the parity write-in has succeeded at step S8, then it is checked at step S9 whether the final logical bloc address has been reached or not. Subsequently, the processings from step Si are repeated till the final logical block address is reached. Alternatively, case of having failed in the parity write-in at step S8, if medium abnormality is determined at step S10, then the replacement processing is executed to recover the medium abnormality, after which the parity is again written into the replaced area. Although the above embodiments have been directed to the magnetic disk devices as the disk devices by way of example, any proper storage devices could be employed as examples. The present invention is not intended to be restricted to the above embodiments, but encompasses any proper variants without impairing the objects and advantages thereof. Further, the present invention is not limited by the numerical values indicated in the above embodiments.

What is claimed is:

1. A storage control apparatus configured to write plural pieces of user data into (n-1) storage devices of n storage devices and to write parity data calculated from the plural pieces of user data into remaining one (1) storage device, the storage control apparatus comprising:

a failure monitoring unit arranged to add points in proportion to detected abnormality to find statistically added points for each of the storage devices, the failure monitoring unit issuing an instruction to re-create parity when the statistically added points come closer to a predefined failure determination point; and a parity re-creation unit arranged, when receiving the instruction to re-create parity from the failure monitoring unit, to read the plural pieces of user data from the (n-1) storage devices to re-calculate parity data for write into the remaining one (1) storage device.

2. The storage control apparatus of claim 1, wherein the failure monitoring unit issues an instruction to initiate re-creation of parity when the statistically added points reach a given threshold value obtained by multiplying the failure determination point by a coefficient less than 1.

3. The storage control apparatus of claim 1, wherein the failure monitoring unit issues an instruction to initiate re-creation of parity when the statistically added points reach a given threshold value obtained by multiplying the failure determination point by a coefficient in the range of 0.7 to 0.9.

4. The storage control apparatus of claim 1, wherein the failure monitoring unit issues an instruction to initiate re-creation of parity when self-diagnostic abnormality based on SMART feature is output from one of the plurality of storage devices.

5. The storage control apparatus of claim 1, wherein the plurality of storage devices have a redundant configuration of RAID5.

6. The storage control apparatus of claim 1, further comprising a channel adapter connecting to a host, a device adapter connecting the plurality of storage devices to one another, and a central processing module interposed between the channel adapter and the device adapter, wherein the failure monitoring unit is disposed in the central processing module, wherein the parity re-creation unit is disposed in the device adapter, and wherein the central processing module instructs the device adapter on re-creation of parity for execution.

7. A storage control method writing plural pieces of user data into (n-1) storage devices of n storage devices and writing parity data calculated from the plural pieces of user data into remaining one (1) storage device, the storage control method comprising:

a failure monitoring step of issuing an instruction to re-create parity depending on the degree of detected abnormality for each of the storage devices; and a parity re-creation step, when receiving the instruction to re-create parity from the failure monitoring step, of reading the plural pieces of user data from the (n-1) storage devices to re-calculate parity data for write into the remaining one (1) storage device.

8. The storage control method of claim 7, wherein the failure monitoring step includes issuing an instruction to initiate re-creation of parity when the statistically added points reach a given threshold value obtained by multiplying the failure determination point by a coefficient less than 1.

9. The storage control method of claim 7, wherein the failure monitoring step includes issuing an instruction to initiate re-creation of parity when the statistically added points reach a given threshold value obtained by multiplying the failure determination point by a coefficient in the range of 0.7 to 0.9.

10. The storage control method of claim 7, wherein the failure monitoring step includes issuing an instruction to initiate re-creation of parity when self-diagnostic abnormality based on SMART feature is output from one of the plurality of storage devices.

11. The storage control method of claim 7, wherein the plurality of storage devices have a redundant configuration of RAID5.

12. The storage control method of claim 7, in which are disposed a channel adapter connecting to a host, a device adapter connecting the plurality of storage devices to one another, and a central processing module interposed between the channel adapter and the device adapter, wherein the failure monitoring step is processed by the central processing module, wherein the parity re-creation step is processed by the device adapter, and wherein the central processing module instructs the device adapter on re-creation of parity for execution.

13. A program operable to drive a computer of a storage control apparatus writing plural pieces of user data into (n-1) storage devices of n storage devices and writing parity data calculated from the plural pieces of user data into remaining one (1) storage device to execute:

a failure monitoring step of adding points in proportion to detected abnormality to find statistically added points for each of the storage devices, and issuing an instruction to re-create parity when the statistically added points come closer to a predefined failure determination point; and a parity re-creation step, when receiving the instruction to re-create parity from the failure monitoring step, of reading the plural pieces of user data from the (n-1) storage devices to re-calculate parity data for write into the remaining one (1) storage device.

14. The program of claim 13, wherein the failure monitoring step includes issuing an instruction to initiate re-creation of parity when the statistically added points reach a given threshold value obtained by multiplying the failure determination point by a coefficient less than 1.

15. The program of claim 13, wherein the failure monitoring step includes issuing an instruction to initiate re-creation of parity when the statistically added points reach a given threshold value obtained by multiplying the failure determination point by a coefficient in the range of 0.7 to 0.9.

16. The program of claim 13, wherein the failure monitoring step includes issuing an instruction to initiate re-creation of parity when self-diagnostic abnormality based on SMART feature is output from one of the plurality of storage devices.

17. The program of claim 13, wherein the plurality of storage devices have a redundant configuration of RAID5.

* * * * *